Figure 1:
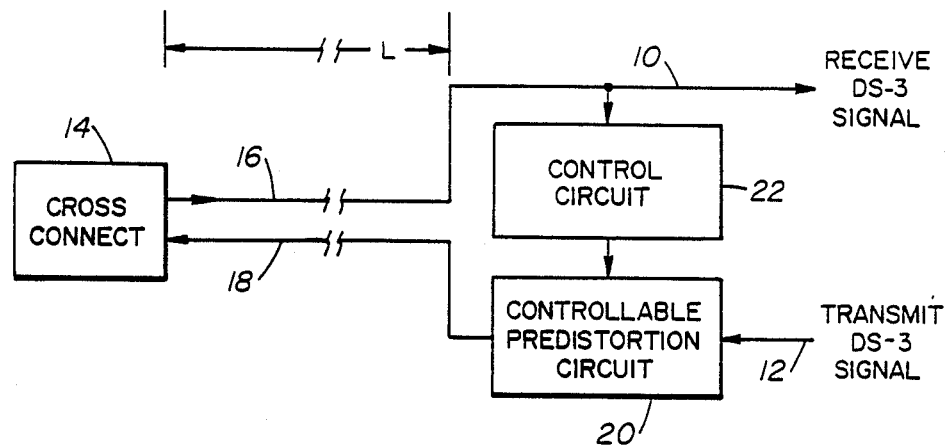

United States Patent [19]

Grover

[11] Patent Number: 4,837,780
[45] Date of Patent: Jun. 6, 1989

[54] TRANSMIT LINE BUILDOUT CIRCUITS

[75] Inventor: Wayne D. Grover, Edmonton, Canada

[73] Assignee: Northern Telecom Limited, Montreal, Canada

[21] Appl. No.: 77,914

[22] Filed: Jul. 27, 1987

[51] Int. Cl.[4] .......................... H03H 7/30; H03K 5/59
[52] U.S. Cl. ...................................... 375/11; 379/93; 379/400
[58] Field of Search ...................... 375/3, 3.1, 4, 11, 76; 379/394, 398, 399, 400, 401; 370/24; 333/17 R, 28 R

[56] References Cited

U.S. PATENT DOCUMENTS

| | | | |
|---|---|---|---|
| 3,483,335 | 12/1969 | Piotrowski | 379/398 |
| 3,578,914 | 5/1971 | Simonelli | 379/400 |
| 3,989,906 | 11/1976 | Kiko | 379/400 |
| 3,989,907 | 11/1976 | Chambers, Jr. | 379/400 |
| 4,037,066 | 7/1977 | Kiko | 379/400 |
| 4,061,883 | 12/1977 | Chambers et al. | 379/401 |
| 4,071,842 | 1/1978 | Tewksbury | 375/11 |
| 4,377,858 | 3/1983 | Treiber | 370/24 |
| 4,381,561 | 4/1983 | Treiber | 370/24 |
| 4,413,240 | 11/1983 | Dyke | 379/93 |
| 4,592,068 | 5/1986 | Jessop et al. | 375/3 |
| 4,605,826 | 8/1986 | Kanemasa | 370/32.1 |
| 4,700,357 | 10/1987 | Ast | 375/76 |

Primary Examiner—Robert L. Griffin
Assistant Examiner—Stephen Chin
Attorney, Agent, or Firm—R. John Haley

[57] ABSTRACT

A characteristic of a signal received via a receive line is monitored and used for automatic control of a line buildout circuit in a transmit signal path. The characteristic is conveniently an amplitude level, or differential amplitude levels for different signal bandwidths, of the received signal. The transmit line buildout circuit includes a transversal filter in which multiplier coefficients or delay times are controlled. The arrangement is particularly useful for digital signal interfaces on a digital cross connect.

17 Claims, 2 Drawing Sheets

TRANSMIT LINE BUILDOUT CIRCUITS

This invention relates to transmit line buildout (LBO) circuits, and is particularly concerned with an automatically adaptive LBO circuit.

It is well known to provide an LBO circuit in a digital signal receive path to compensate for different cable lengths via which the signal may have been transmitted. For example, Simonelli U.S. Pat. No. 3,578,914 issued May 18, 1971 discloses an equalizer with an automatically variable LBO circuit for a PCM repeater, in which the amount of series resistance provided in the LBO circuit is controlled in dependence upon the level of a received and equalized PCM signal as detected by a peak detector. The use of an automatically variable LBO circuit avoids the need for manual adjustment of the LBO circuit.

For signals to be transmitted, however, it has been traditionally accepted that compensation can not be provided automatically because the cable length via which the signal is to be transmitted cannot be determined without using such techniques as return loss analysis or time domain reflectometry. In PCM repeaters, this causes no problems because the compensation is simply provided at the receive end of each cable length.

With the introduction of so-called cross connects, which serve to switch digital signals at prescribed bit rates between incoming and outgoing digital signal paths, however, it is desirable to provide LBO circuits in both the receive and transmit lines for equipment connected to the cross connect via cables having lengths within a prescribed range. For example, for DS-3 signals having a bit rate of 44.736 Mb/s, specifications dictate that the cable length between the cross connect and the connected (e.g. digital signal transmission) equipment be in the range from 0 to 450 feet, and that proper equalization be provided to achieve a specified signal format for cable lengths anywhere within this range. To satisfy these specifications, manual switching of transmit LBO circuits has been necessary.

The need for such manual switching is not only inconvenient, but also presents a significant problem for equipment using protection channel switching for increased communications reliability. With protection channel switching, typically an extra protection channel is provided to carry the traffic of any one of a group of normal channels in the event of a fault on the normal channel. With manual switching of LBO circuits, each normal channel can only be protected by a protection channel having the same manual switch settings in its LBO circuit.

Accordingly, an object of this invention is to provide an automatically adaptive transmit LBO circuit.

According to this invention there is provided a transmit line buildout circuit comprising: control means for producing a control signal in dependence upon a level of a signal on a receive path, said level being dependent upon the length of a receive line via which the signal on the receive path is received; and signal modifying means responsive to the control signal for modifying in a predetermined manner a transmit path signal to be transmitted via a transmit line, thereby to compensate for a corresponding length of the transmit line wherein the control means comprises spectral filtering means for filtering the signal on the receive path to produce at least two receive path signals with different frequency bands, and means for producing the control signal in dependence upon level differences between said at least two receive path signals.

Thus the invention uses level characteristics of a receive path signal to provide for control of the manner in which a transmit path signal is modified, on the reasonable basis that the receive and transmit lines have similar lengths.

Preferably the signal modifying means comprises at least one delay means for delaying the transmit path signal, and summing means for summing the delayed and undelayed transmit path signals with respective weights to produce a modified transmit path signal. The modified transmit path signal is desirably low-pass filtered before being supplied to the transmit line.

In one embodiment of the invention the respective summing weights are dependent upon the control signal. In another, preferred, embodiment delay of the transmit path signal by the delay means is dependent upon the control signal. More particularly, preferably the signal modifying means comprises delay means and summing means for summing with respective weights the transmit path signal with a first delayed transmit path signal or a second delayed transmit path signal, depending upon the control signal, the first and second delayed transmit path signals being delayed by the delay means by different amounts.

The use of level differences to produce the control signal. This results in the desired wave shaping of the signal on the transmit path based on the wave shape of the signal on the receive path without dependence upon the latter signals's absolute level, which may vary in accordance with prescribed interface specifications.

Figure 2:
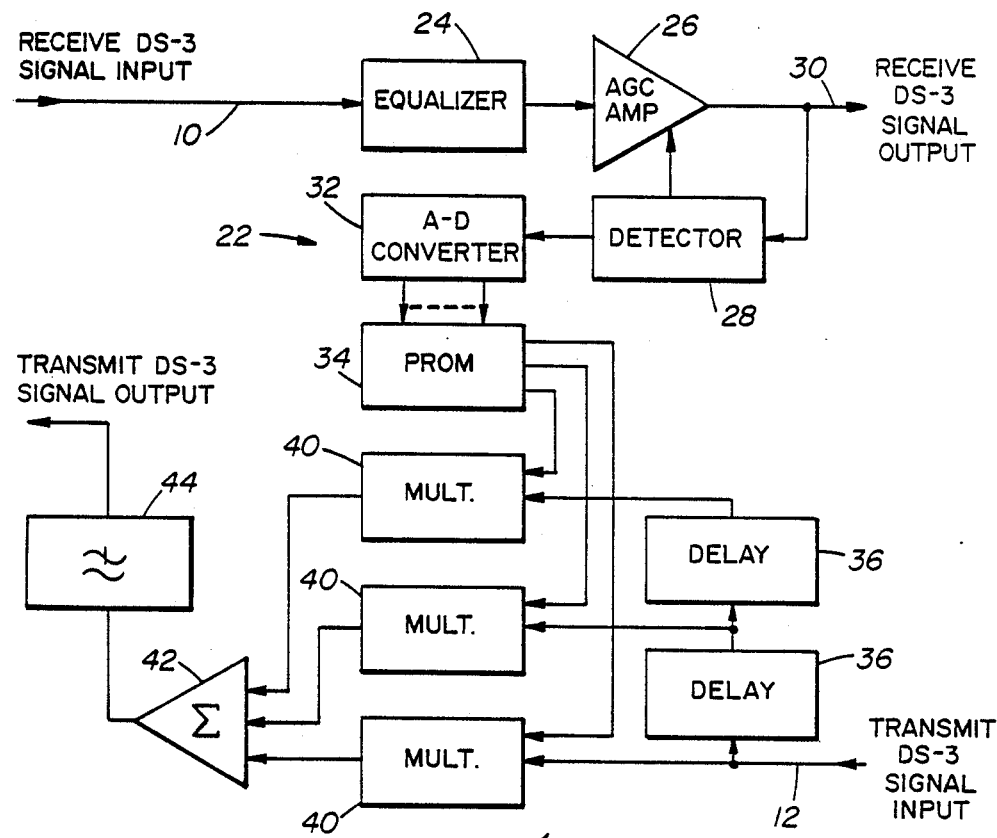
Figure 3:
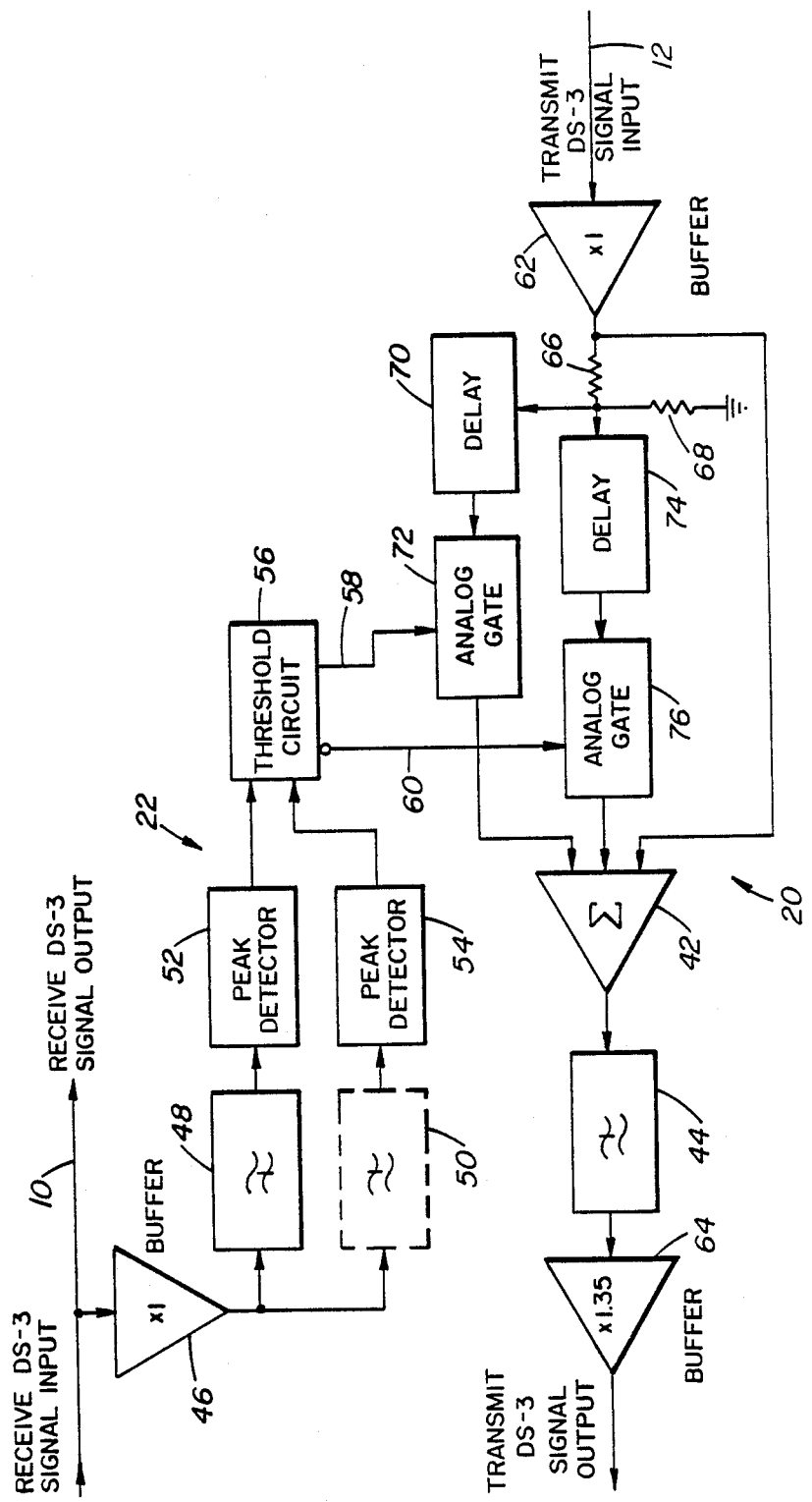

The invention will be further understood from the following description with reference to the accompanying drawings, in which the same references are used in the different figures to denote similar elements and in which:

FIG. 1 illustrates in a block diagram a relationship between a transmit LBO circuit in accordance with an embodiment of the invention and a cross connect;

FIG. 2 schematically illustrates a transmit LBO circuit in accordance with an embodiment of the invention; and FIG. 3 schematically illustrates a transmit LBO circuit in accordance with another embodiment of the invention.

Referring to FIG. 1, there are illustrated receive and transmit DS-3 signal paths 10 and 12 respectively of a piece of bidirectional digital signal transmission equipment which is connected to a cross connect 14 via receive and transmit cables 16 and 18 respectively. Each of the cables 16 and 18 has a length within the prescribed range of 0 to 450 feet.

For simplicity and clarity, FIG. 1 does not illustrate other cables connected to the cross connect 14, from and to which the DS-3 signals on the cables 16 and 18 are switched by the cross connect in known manner, and details of the digital signal transmission equipment itself, including receive LBO and equalization circuits, which form no part of this invention.

In accordance with the invention, a controllable predistortion circuit 20 is provided in the transmit signal path 12 to constitute a transmit LBO circuit. The circuit 20 is automatically adaptively controlled by a control circuit 22 to produce a wave-shaped output from a rectangular bipolar waveform supplied to its input from the transmit signal path 12. The control circuit 22, which has an input coupled to the receive signal path 10, controls the circuit 20 in dependence upon one or more predetermined parameters or characteristics of the DS-3 signal on the receive path.

It should be appreciated that the circuits 20 and 22 may equally be provided at the cross connect 14 itself, the digital signal transmission equipment including similar circuitry or comprising conventional fixed LBO circuitry.

The invention is based upon the reasonable assumption that the cables 16 and 18 have approximately the same length L, which is the case in many applications. Consequently, the characteristics of the signal on the receive path 10 provide a representation of the length L, and can be used to provide appropriate control of predistortion applied by the circuit 20 to the signal on the transmit path 12 to compensate for different lengths of the cable 18. The control circuit 22 produces a control signal in dependence upon such characteristics, which control signal is used by the circuit 20 to determine the predistortion which is applied to the signal on the transmit path 12.

The characteristics of the receive path signal which are relied upon by the control circuit 22 can be arbitrarily selected, but conveniently comprise an easily determined characteristic, such as some function of the receive path signal amplitude. FIGS. 2 and 3 illustrate two alternative embodiments of the invention in which the control circuit uses different characteristics to produce the control signal.

Referring to FIG. 2, in addition to the circuits 20 and 22 there are illustrated an equalizer 24, AGC amplifier 26, and associated detector 28 which are provided in known manner in the receive path 10 for providing an equalized and constant amplitude receive signal on a receive DS-3 signal output line 30. The equalizer 24 may alternatively be connected following the amplifier 26. The control circuit 22 in FIG. 2 comprises an A-D (analog-to-digital) converter 32 and a PROM (programmable read-only memory) 34. The converter 32 derives from the detector 28 an analog signal representative of the level of the receive path signal and converts this into a digital signal which is supplied as an address to the PROM 34, which has a plurality of output lines, as discussed below, for digital signals which collectively constitute the control signal.

The controllable predistortion circuit 20 in FIG. 2 comprises a transversal filter arrangement comprising delay circuits 36 and multipliers 40, a summing amplifier 42, and a low-pass filter 44. Although two delay circuits 36 and three multipliers 40 are shown, other numbers of these units may be provided.

The signal on the transmit path 12 is supplied, undelayed and with successive delays via the delay circuits 36, to one input of each of the multipliers 40. A second input of each multiplier 40 is connected to a respective output line of the PROM 34, and a product signal produced by each multiplier 40 is supplied to a respective input of the summing amplifier 42 which sums the product signals to produce a resultant predistorted signal. This resultant signal is filtered in the low-pass filter 44, to remove undesired high-frequency components arising from the transversal filter, to produce a transmit path DS-3 output signal.

Thus in the embodiment of FIG. 2, the PROM 34 stores multiplication coefficients for the multipliers 40, which coefficients are determined by the level of the received signal on the receive path 10 to achieve an appropriate predistortion of the transmit path signals to compensate for the length of the connected cable, e.g. 18.

By way of example, in the embodiment of FIG. 2 for DS-3 signals the A-D converter 32 can be a linear converter having a low bandwidth, for example 20 kHz, providing a 4-bit output with 16 possible values. The PROM 34 can provide 16×9 bits of storage, providing a 3-bit coefficient for each of the three multipliers 40 for each of the 16 possible values. Each of the multipliers 40 can comprise a binary weighted current ladder or scaler comprising only field effect transistors and resistors. The delay circuits 36 can comprise 22ns delay elements each having a passband preferably in the range from 100 kHz to 90 MHz. Except for the delay circuits 36, all of the elements of the transmit LBO circuit can be provided in a single integrated circuit.

Whilst the above 90 MHz (four times Nyquist frequency) delay element bandwidth is ideal, it may be economically advantageous to use delay elements with a significantly narrower bandwidth than 90 MHz. As long as the actual transfer function of the delay element is known, it can be accommodated by selecting appropriate delays and weightings so that the desired transmit path output signal waveshape is still obtained.

FIG. 3 illustrates an alternative embodiment of the invention in which the cable length L is determined from the differential spectral content of the receive path signal and delay in a transversal filter is controlled rather than multiplier coefficients to provide the required transmit signal predistortion. It has been found by computer simulation and experimentally verified that the loss characteristics of the cable 18 with varying length can be approximated more practically by such delay control than the coefficient control of FIG. 2.

Referring to FIG. 3, the control circuit 22 comprises a unity-gain buffer 46, a high-pass filter 48, an optional low-pass filter 50 which is preferably omitted and which accordingly is shown in broken lines, two peak detectors 52 and 54, and a threshold circuit 56. The buffer 46 has an input connected to the receive path 10 and an output coupled via the high-pass filter 48 to the peak detector 52 and coupled via the optional low-pass filter 50 to the peak detector 54. The high-pass filter 48 has a 3 dB cut-off frequency of 20 MHz, so that the peak detector 52 produces a d.c. level representing the receive signal amplitude in the frequency band above 20 MHz. The peak detector 54 produces a d.c. level representing the receive signal amplitude at lower frequencies when the low-pass filter 50 is present, or at all frequencies in the absence of the low-pass filter 50.

In the threshold circuit 56 a difference signal between the two d.c. levels is formed, which varies from 13 to 100 mv for cable lengths from 450 to zero feet respectively, and is compared in a comparator with a threshold value to produce a logic 1 level, constituting the control signal, on one of two complementary output lines 58 and 60. The difference signal is a function of the cable length, and the threshold value is selected so that a logic 1 level is produced on the line 58 for cable lengths from 200 to 450 feet and on the line 60 for cable lengths from zero to 250 feet. The comparator in the threshold circuit 56 is provided with hysteresis to ensure stability of the control signal in the overlapping range from 200 to 250 feet. As allowable power levels for a DS-3 signal can vary over a range of 6 dB, the use of the difference signal rather than the absolute received signal level is advantageous.

The controllable predistortion circuit 20 in FIG. 3 is similar to that in FIG. 2 in that it comprises a transversal filter arrangement, a summing amplifier 42, and a low-pass filter 44. It also comprises a unity-gain buffer 62 via which the transmit signal is coupled from the transmit path 12 to the transversal filter, and a buffer 64, having a gain of 1.35 to compensate for insertion loss, which couples the output of the filter 44 to the cable 18.

In the transversal filter of FIG. 3, the output of the buffer 62 is connected directly to one input of the summing amplifier 42. An attenuator comprising resistors 66 and 68 provides a fixed attenuation, with an attenuation coefficient of 0.2, to the output of the buffer 62. The attenuated signal is coupled to another input of the summing amplifier 42 either via a 5 ns delay circuit 70 and an analog gate (transmission gate) 72 when the line 58 carries a logic 1 level, or via a 14 ns delay circuit 74 and an analog gate 76 when the line 60 carries a logic 1 level. Thus in FIG. 3 the summing amplifier 42 adds to the transmit signal an attenuated and delayed component of the transmit signal, the attenuation being fixed and the delay being 5 ns or 14 ns depending upon whether the cable length has been determined to be greater than 200 feet or less than 250 feet respectively. The circuit thus provides automatic compensation, in a particularly simple manner, for different transmit path cable lengths.

It should be appreciated that in the arrangement of FIG. 3 the difference signal could be compared with a plurality of threshold levels to provide a greater number of control signals for controlling a greater number of delay paths in the transversal filter, and that the weighting could be different for the different delay paths and also could be varied in the manner described with reference to FIG. 2. Furthermore, the difference signal could be produced by different filtering or analysis arrangements to that shown, and a plurality of difference signals could be produced if desired. For example, the receive path signal could instead be filtered using two or more narrow bandpass or notch filters having pass bands at selected receive path signal frequencies, such as at the Nyquist frequency (half the symbol rate) and odd multiples thereof.

In the arrangement of FIG. 3 the peak detectors 52 and 54 may be replaced by other forms of detecting device, such as average power detectors, in order to reduce the need for balancing of the detectors so that they are relatively independent of the absolute level of the receive path signal. The detectors may be followed by logarithmic amplifiers, or may have a logarithmic response, so that the threshold circuit 56 is responsive to the ratio of detected levels of the filtered receive path signal, or the threshold circuit 56 may itself be replaced by a dividing circuit which is directly responsive to such ratio.

The embodiments of the invention described above relate to unbalanced DS-3 signals. However, it should be appreciated that the principles of the invention apply equally to signals having other frequencies and formats, and to signals on balanced lines. In this respect it is observed that the summing in the amplifier 42 in FIGS. 2 and 3 produces a predistortion of a bandlimiting type. In other applications, especially for example in the case of DS-1 signals, one or more of the delay path signals may be subtracted to produce a high frequency emphasis form of predistortion.

Accordingly, it should be appreciated that numerous modifications, variations, and adaptations may be made to the described embodiments without departing from the scope of the invention as defined in the claims.

What is claimed is:

1. A transmit line buildout circuit comprising:
   control means for producing a control signal in dependence upon a level of a signal on a receive path, said level being dependent upon the length of a receive line via which the signal on the receive path is received; and
   signal modifying means responsive to the control signal for modifying in a predetermined manner a transmit path signal to be transmitted via a transmit line, thereby to compensate for a corresponding length of the transmit line;
   wherein the control means comprises spectral filtering means for filtering the signal on the receive path to produce at least two receive path signals with different frequency bands, and means for producing the control signal in dependence upon level differences between said at least two receive path signals.

2. A transmit line buildout circuit as claimed in claim 1 wherein the signal modifying means comprises at least one delay means for delaying the transmit path signal, and summing means for summing the delayed and undelayed transmit path signals with respective weights to produce a modified transmit path signal.

3. A transmit line buildout circuit as claimed in claim 2 and including means for low-pass filtering the modified transmit path signal.

4. A transmit line buildout circuit as claimed in claim 2 wherein said respective weights are dependent upon the control signal.

5. A transmit line buildout circuit as claimed in claim 4 wherein there are two delay means for producing two different delays of the transmit path signal.

6. A transmit line buildout circuit as claimed in claim 2 wherein there are two delay means for producing two different delays of the transmit path signal.

7. A transmit line buildout circuit as claimed in claim 2 wherein delay of the transmit path signal by the delay means is dependent upon the control signal.

8. A transmit line buildout circuit as claimed in claim 1 wherein the signal modifying means comprises delay means and summing means for summing with respective weights the transmit path signal with a first delayed transmit path signal or a second delayed transmit path signal, depending upon the control signal, the first and second delayed transmit path signals being delayed by the delay means by different amounts.

9. A transmit line buildout circuit as claimed in claim 1 wherein the spectral filtering means comprises a high-pass filter.

10. A transmit line buildout circuit as claimed in claim 8 wherein the spectral filtering means comprises a high-pass filter.

11. A transmit line buildout circuit as claimed in claim 10 and including means for low-pass filtering the modified transmit path signal.

12. Apparatus comprising:
    separate transmit and receive paths, for connection to separate transmit and receive lines respectively, for respectively transmitting and receiving signals via said lines;
    control means for producing a control signal in dependence upon a predetermined characteristic of a signal on the receive path, said predetermined characteristic being dependent upon the length of the receive line, the control means comprising spectral filtering means for filtering the signal on the receive path to produce at least two receive path signals with different frequency bands, and means for producing the control signal in dependence upon differences between said at least two receive path signals; and signal modifying means responsive to the control signal for modifying in a predetermined manner a signal on the transmit path to be transmitted via the transmit line, thereby to compensate for a corresponding length of the transmit line.

13. Apparatus as claimed in claim 12 wherein the signal modifying means comprises at least one delay means for delaying the transmit path signal, and summing means for summing the delayed and undelayed transmit path signals with respective weights to produce a modified transmit path signal.

14. Apparatus as claimed in claim 13 and including means for low-pass filtering the modified transmit path signal.

15. Apparatus as claimed in claim 13 wherein said respective weights are dependent upon the control signal.

16. Apparatus as claimed in claim 13 wherein delay of the transmit path signal by the delay means is dependent upon the control signal.

17. Apparatus as claimed in claim 12 wherein the signal modifying means comprises delay means and summing means for summing with respective weights the transmit path signal with a first delayed transmit path signal or a second delayed transmit path signal, depending upon the control signal, the first and second delayed transmit path signals being delayed by the delay means by different amounts.

* * * * *